United States Patent [19]

Sassi

[11] Patent Number: 4,825,990
[45] Date of Patent: May 2, 1989

[54] APPARATUS FOR TRANSMITTING TORQUE FROM A DRIVING SHAFT TO A DRIVEN SHAFT, PARTICULARLY AN OVER-RUNNING CLUTCH

[75] Inventor: Kari Sassi, Lohja, Finland

[73] Assignee: Konejukka Oy, Finland

[21] Appl. No.: 933,219

[22] PCT Filed: Mar. 11, 1986

[86] PCT No.: PCT/FI86/00025

§ 371 Date: Nov. 4, 1986

§ 102(e) Date: Nov. 4, 1986

[87] PCT Pub. No.: WO86/05563

PCT Pub. Date: Sep. 25, 1986

[30] Foreign Application Priority Data

Mar. 12, 1985 [FI] Finland .................. 850984

[51] Int. Cl.[4] ............................................. F16D 41/00
[52] U.S. Cl. .................................... 192/41 R; 192/54; 192/74; 192/103 B
[58] Field of Search .................. 192/37, 41 R, 72, 74, 192/103 B, 54, 73

[56] References Cited

U.S. PATENT DOCUMENTS

| | | | |
|---|---|---|---|
| 1,992,527 | 2/1935 | Garratt | 192/41 R |
| 3,021,925 | 2/1962 | Osborne | 192/41 R X |
| 3,107,764 | 10/1963 | Fulton | 192/41 R |
| 4,270,638 | 6/1981 | Sassi | 192/74 X |
| 4,341,294 | 7/1982 | Kerr | 192/77 X |
| 4,413,713 | 11/1983 | West | 192/54 X |

FOREIGN PATENT DOCUMENTS

| | | | |
|---|---|---|---|
| 24915 | 2/1906 | Austria | 192/54 |
| 766725 | 7/1934 | France | 192/41 R |
| 1005049 | 4/1952 | France | 192/41 R |
| 286421 | 1/1971 | U.S.S.R. | 192/41 R |

*Primary Examiner*—Rodney H. Bonck
*Attorney, Agent, or Firm*—Steinberg & Raskin

[57] ABSTRACT

The invention relates to apparatus for transmitting torque from a driving shaft to a driven shaft, particularly an overrunning clutch, which works as an overrunning clutch in both directions. The apparatus comprises a part located within the clutch body and fitted with an internal engaging surface whose center line deviates from the center line of the driving shaft and with an external engaging surface whose center line is the same as the center line of the driving shaft. On the driving shaft there is a first engaging element which, in the engaging position, engages the internal engaging surface of the part within the clutch body in such a way that this engagement makes the external engaging surface of the part within the clutch body engage the internal engaging surface of the clutch body. There is also another engaging element on the driving shaft, which is movably arranged onto the driving shaft in such a way that at a certain rotating speed the second engaging element is arranged to engage the part within the clutch body, and that at a lower rotating speed the second engaging element is arranged to be disengaged from the part located within the clutch body.

16 Claims, 3 Drawing Sheets

APPARATUS FOR TRANSMITTING TORQUE FROM A DRIVING SHAFT TO A DRIVEN SHAFT, PARTICULARLY AN OVER-RUNNING CLUTCH

BACKGROUND OF THE INVENTION

The present invention relates to an apparatus for transmitting torque from a driving shaft to a driven shaft, particularly an overrunning clutch, which comprises at least one part, located within the clutch body, fitted with an internal engaging surface, whose center line deviates from the center line of the driving shaft, and with an external engaging surface, whose center line is the same as the center line of the driving shaft, at least one engaging element, the first one on the driving shaft, which, at least when the clutch body is in the engaging position, engages with the internal engaging surface of the part within the clutch body, while said engagement makes the external engaging surface of the part within the clutch body engage with the internal engaging surface of the clutch body, and at least one engaging element, the second one on the driving shaft, which, when the clutch body is in the disengaging position, engages with the part within the clutch body, and which engaging element, when the clutch body is in the engaging position, is disengaged from the part within the clutch body.

Torque is conventionally transmitted from a driving shaft to a driven shaft by means of various couplings and clutches. Among mechanical couplings and clutches, in which category the present invention can be classified, we know for instance rigid couplings, movable couplings, flexible couplings, releasing clutches and self-acting clutches. For instance U.S. Pat. No. 4,270,638 describes a device for transmitting torque from a driving shaft to a driven shaft, which device, depending on its purpose, may act as a releasing clutch, flexible coupling or a movable coupling. Generally speaking, a device in accordance with this patent may act as a mechanical stepless clutch. Said device comprises a clutch body, in which there is a part with an internal tooth ring, which part engages with the clutch body in an engaging situation. On the driving shaft there is a gear that meshes with the internal tooth ring. The internal tooth ring is installed eccentrically with regard to the driving shaft so that when the driving shaft is turned, the gear on the shaft forces the part with the tooth ring move in the direction of the radius of the shaft and engage with the clutch body.

In the device in accordance with this patent, there is also another engaging element, with which the device can be engaged in such a way that torque is not transmitted from the driving shaft to the clutch body; thence torque is not transmitted from the driving shaft to the driven shaft. However, the function of this second engaging element is not automated but has to be engaged separately. Therefore a device in accordance with this patent cannot work as an automatic overrunning clutch; instead, for this purpose it has to be fitted with engaging elements, with which the connection can be disengaged.

SUMMARY OF THE INVENTION

Accordingly, it is the object of the present invention to provide an apparatus for transmitting torque from a driving shaft to a driven shaft, which apparatus may work both as a mechanical stepless clutch and an overrunning clutch. An additional object of this invention is to provide such an apparatus for transmitting torque from a driving shaft to a driven shaft whose design is simple and which is not technically difficult to manufacture.

The objects of the invention are attained by an apparatus whose principal characteristic feature is that said second engaging element is arranged onto the driving shaft to be moved by centrifugal force so that at a certain or higher rotating speed of the driving shaft said second engaging element is arranged to engage with the part within the clutch body, and at a lower rotating speed of the driving shaft said second engaging element is arranged to be disengaged from the part within the clutch body.

Several advantages are attained by an apparatus in accordance with the invention for transmitting torque from a driving shaft to a driven shaft, among them the facts that the apparatus is simple and cheap to manufacture, that it can function both as a stepless mechanical clutch and as an overrunning clutch, that it is reliable and virtually non-wearing. The apparatus has a very wide sphere of application as it can be used for instance as a motor vehicle clutch as well as an industrial clutch.

BRIEF DESCRIPTION OF THE DRAWINGS

The invention will be described in detail below, with reference to the figures in the accompanying drawings which illustrate a favourable embodiment of an apparatus in accordance with the invention.

DESCRIPTION OF THE PREFERRED EMBODIMENTS

Figure 1:
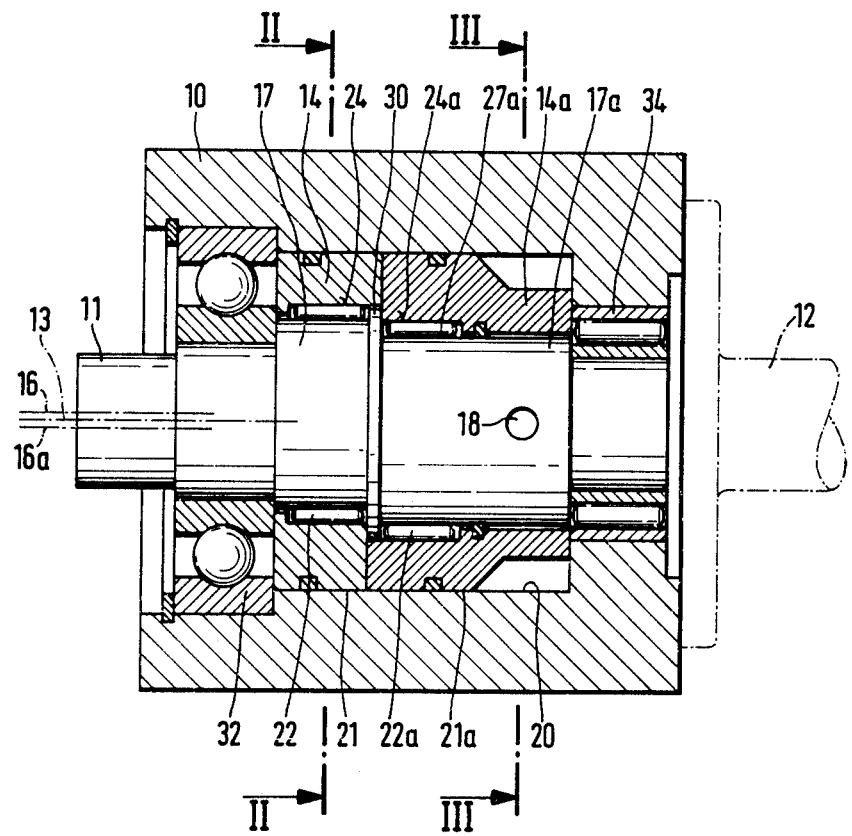
FIG. 1 is a schematic cross section of an embodiment of an apparatus in accordance with the invention.
Figure 2:
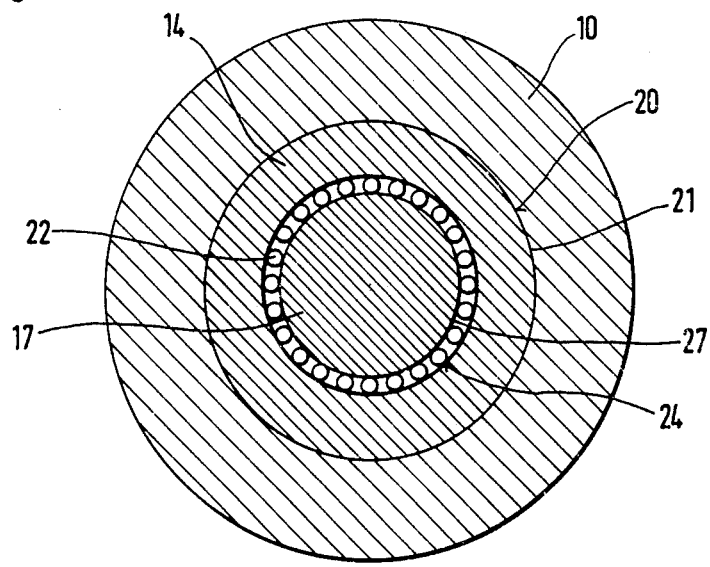
FIG. 2 shows section view II—II in FIG. 1.
Figure 3:
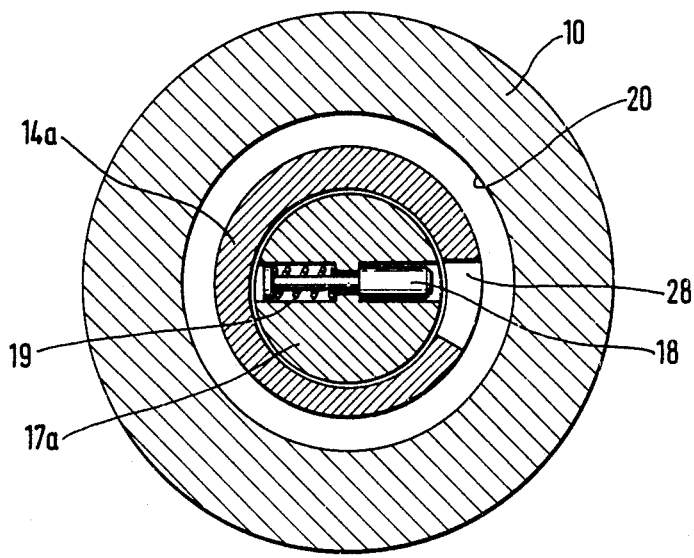
FIG. 3 shows section view III—III in FIG. 1.

In the embodiment shown in FIGS. 1 to 3 the driving shaft is referred to by 11 and the driven shaft is referred to by 12. The center line of the driving shaft 11 is referred to by 13. The apparatus in accordance with the invention comprises a clutch body 10, within which there are, in this embodiment, two eccentric parts 14 and 14a. The part 14 has an internal engaging surface 24, whose center line deviates from the center line 13 of the driving shaft 11.

Similarly the part 14a has an internal engaging surface 24a, whose center line also deviates from the center line 13 of the driving shaft 11. In this embodiment the internal engaging surfaces of the parts 14 and 14a are internal cylindrical surfaces, within which needle rings 22 and 22a, respectively, are arranged. The clutch body 10 has an internal engaging surface 20, within which the parts 14 and 14a are installed. The parts 14 and 14a have external engaging surfaces 21 and 21a, respectively with center lines thereof being the same as the center line 13 of the drive shaft 11. Between the internal engaging surface 20 of the clutch body 10 and the external engaging surfaces of the parts 14 and 14a there is a clearance, which enables the parts 14 and 14a to rotate within the clutch body 10. The space within the clutch body 10 is filled with oil, and the clutch body 10 is of course sealed to prevent oil from leaking out.

In the embodiment of FIGS. 1 to 3, the two first engaging elements 17 and 17a are installed on the driving shaft 11, which engaging elements, in accordance with the invention, are cylindrical surfaces machined onto the shaft 11 with center lines deviating from the center line 13 of the driving shaft 11. The center line of the first engaging element 17 within the part 14 is the same as in the situation illustrated in the figures, the center line 16 of the internal engaging surface of the part 14, and the center line of the first engaging element 17a within the part 14a is the same as the center line 16a of the internal engaging surface 24a of the part 14a. The first engaging elements 17 and 17a have external engaging surfaces 27 and 27a, which, at least when the apparatus is in the engaging position, form, by means of needle rings 22 and 22a, a connection between the internal engaging surfaces 24 and 24a of the parts 14 and 14a. The driving shaft 11 has also another engaging element 18, which in the embodiment illustrated in the figures is a pin mounted in a substantially radial bore in shaft 11 and loaded by a spring 19. For the coupling pin 18, a suitable slot 28 has been formed in the part 14a located within the clutch body 10. When the clutch body 10 is disengaged, the coupling pin 18 is engaged with the part 14a when the part 14a is in the engaging position. For this purpose the coupling pin 18 is equipped with the spring 19 that pulls the coupling pin 18 from the slot when the part 14a is in the engaging position.

In the embodiment shown in FIGS. 1 to 3, a flange 30 has been machined on the shaft 11 between the first engaging elements 17 and 17a for separating the parts 14 and 14a and the needle rings 22 and 22a from each other. It should however be realized that the two first engaging elements are not necessarily required in an apparatus in accordance with the invention, the apparatus will work with one first engaging element only. Then of course the flange 30 is also unnecessary. The parts 14, 14a arranged axially one after the other and located within the clutch body 10, may be fitted with mating surfaces which prevent these parts 14, 14a from rotating with respect to one another, but which allows the same to move radially with respect to one another. On the other hand, an apparatus in accordance with the invention may also have more than two first engaging elements. On the shaft 11 there may of course also be more than one coupling pin 18 and spring 19. At least one second engaging element 18 may be arranged on the driving shaft 11 for each part 14, 14a within the clutch body 10. As shown in FIG. 1, the driving shaft 11 is supported on the clutch body 10 by means of bearings 32 and 34, of which the first one 32 is a ball bearing and the second one 34 is a roller bearing. The driving shaft 11 may as well be supported by any conventional means.

An apparatus in accordance with the invention (FIGS. 1 to 3) functions as follows. When the driving shaft 11 is rotated, the parts 14 and 14a within the clutch body 10 engage, due to the influence of the first engaging elements 17 and 17a, with the internal engaging surface 20 of the clutch body 10. This is so because there are the needle rings 22 and 22a between the external engaging surfaces 27 and 27a of the first engaging elements 17 and 17a and internal engaging surfaces 24 and 24a of the parts 14 and 14a within the clutch body 10, said needle rings 22 and 22a enabling the first engaging elements 17 and 17a to rotate with respect to the parts 14 and 14a within the clutch body 10. As the first engaging elements 17 and 17a are eccentric with respect to the driving shaft 11, they, when turning around, move the parts 14 and 14a within the clutch body 10 outwards in the direction of the radius. Then the external engaging surfaces 21 and 21a of the parts 14 and 14a within the clutch body 10 contact the internal engaging surface 20 of the clutch body 10 resulting in engagement.

The distances between the center line 13 of the driving shaft 11 and the center lines 16 and 16a of the internal engaging surfaces 24 and 24a of the parts 14 and 14a within the clutch body 10 and the clearance between the external engaging surfaces 21 and 21a of the parts 14 and 14a and internal engaging surface 20 of the clutch body 10 determine how fast and flexibly the engagement occurs. If the clearance between the external engaging surfaces 21 and 21a and the internal engaging surface 20 of the clutch body 10 is selected sufficiently small, the contact angle between the parts 14 and 14a within the clutch body and the clutch body 10 can be made even larger than 180°. As, in the embodiment of FIGS. 1 to 3, there are two first engaging elements 17 and 17a, the contact angle can in this embodiment be when needed made as large as 360°.

The function of an apparatus in accordance with the invention will now be described by way of an example with reference to FIGS. 1 to 3, in which the apparatus is installed in a car that has conventional clutch and transmission. An apparatus in accordance with the invention may be installed in a car for instance between the clutch and the transmission or after the transmission. An apparatus in accordance with the invention can naturally be used not only in motor vehicles but in all types of drive line systems. When the driving shaft 11 is turned, the eccentric first engaging elements 17 and 17a make the parts 14 and 14a within the clutch body 10 engage with the internal engaging surface 20 of the clutch body 10. The second engaging element 18 will now reach the slot 28. When the rotating speed increases, centrifugal force pushes the second engaging element 18 to slot 28. The spring 19 and the second engaging element 18 are so balanced that the second engaging element 18 is fully out for instance when the rotating speed of the driving shaft 11 is directly proportional to the idling speed of the engine. With this kind of arrangement, for instance always after an acceleration, when the accelerator pedal is released and the drive is disengaged from the driving shaft 11, which brings the drive to the driven shaft 12, the other engaging element 18 penetrates into the slot 28 and stops parts 14 and 14a within the clutch body 10 in the neutral position so that the vehicle begins to coast.

In vehicle use the engine braking is always effected by pressing down the clutch pedal. Then the rotating speed of the driving shaft 11 goes under the idling speed and the spring 19 pulls the second engaging element 18 in. As the drive is still on the driven shaft 12, parts 14 and 14a within the clutch body 10 are engaged with the engaging surface 20 of the clutch body 10 to the engine-braking side. The second engaging element 18 is so dimensioned that, in the retracted position, it remains under the inner periphery of the part 14a within the clutch body 10. Therefore in order to engage an apparatus in accordance with the invention in the overrunning clutch position no special attachments or engaging elements are needed but the engagement takes place fully automatically.

Figure 4:
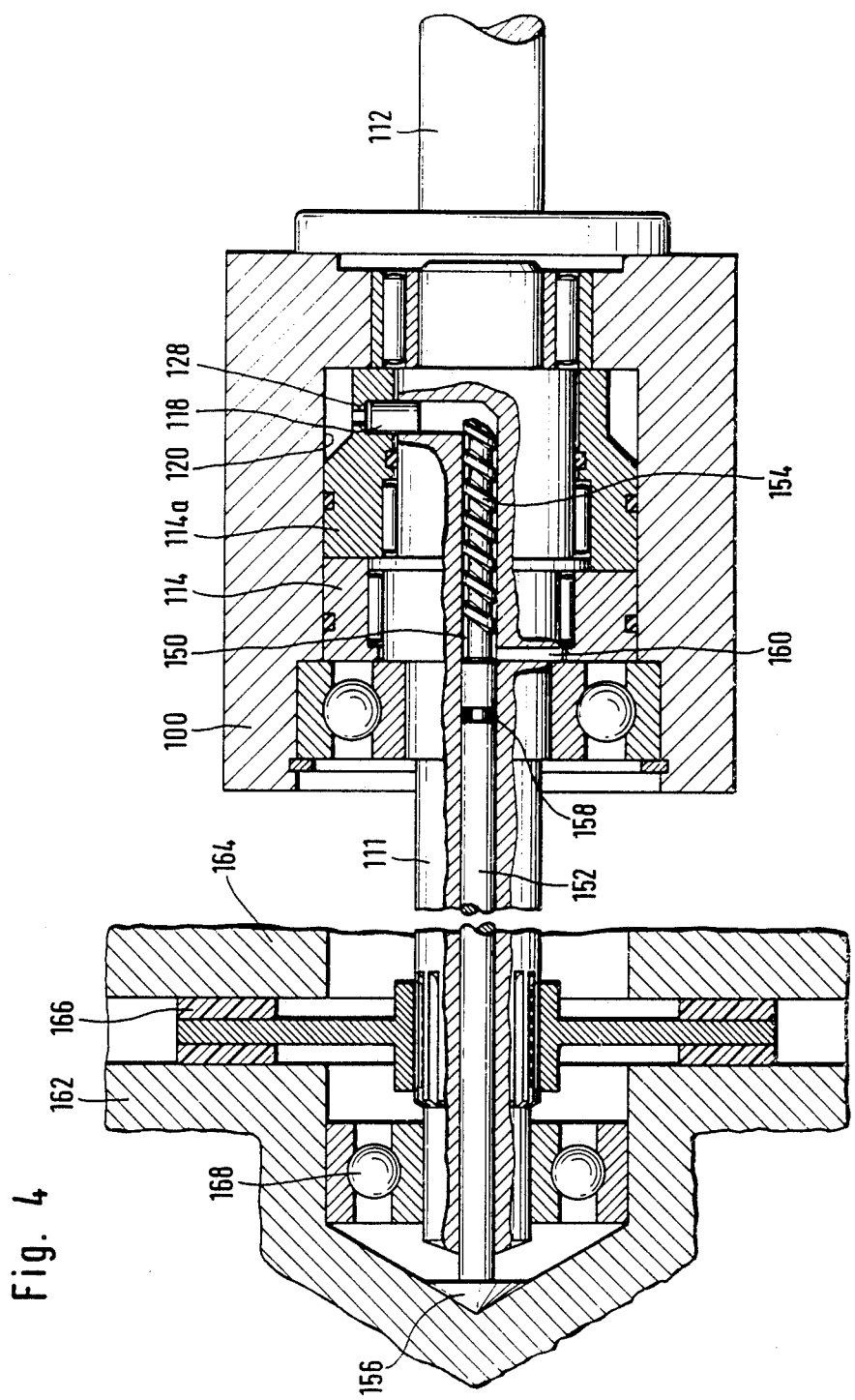
FIG. 4 shows a partial section view of another embodiment of the invention.

FIG. 4 shows an alternative embodiment of an apparatus in accordance with the invention. In FIG. 4 the apparatus is installed on the clutch shaft of a motor vehicle, but the apparatus may of course be used in association with any drive-line shaft. The embodiment shown in FIG. 4 is identical with the embodiment shown in FIGS. 1 to 3 in all respects except the arrangement of the second engaging element 118. In the embodiment of FIG. 4 the second engaging element is composed of a coupling pin, for which a suitable slot 128 is shaped to the part 114a within the clutch body 100. When the clutch body 100 is disengaged, the coupling pin 118 engages with the part 114a within the clutch body 100, but when the clutch body 100 engages, the coupling pin 118 is disengaged from the part 114a within the clutch body 100. When the driving shaft is turned, the first engaging elements make the parts 114 and 114a within the clutch body 100 engage with the internal engaging surface of the clutch body 100. The second engaging element 118 then reaches the slot 128. Now centrifugal force pushes the second engaging element 118 into the slot 128. The second engaging element 118 may also be loaded with a spring which helps to push the second engaging element into the slot 128. In order to return the second engaging element 118 into the retracted position, a longitudinal and concentric boring is shaped into the driving shaft 111, into which boring a spindle 152 is arranged. One end 154 of the spindle, the end of the side of the second engaging element 118, has been shaped as a screw pump. For preventing oil from leaking the spindle 152 is of course sealed with respect to boring 150 for instance with an O-ring seal 158. A radial boring 160, reaching from the axial boring 150 to the outer periphery of the driving shaft 111, is drilled to the opposite end of the driving shaft 111. In the embodiment shown in FIG. 4 the spindle 152 reaches from the clutch body 100 to the flywheel 162, to which the spindle 152 has been fastened with an appropriate element 156. Therefore the spindle 152 will always rotate at the same speed as the flywheel 162. The driving shaft 152 is supported in the normal way to the flywheel 162 with bearing 168. Against flywheel 162 there is a conventional motor vehicle clutch 166, and on the other side of the clutch there is a conventional clutch assembly 164.

When the vehicle starts moving the clutch 166 is engaged of course, whereat the driving shaft 111 and the spindle 152 rotate together and at the same speed. The second engaging element 118 is now pushed by centrifugal force possibly assisted by a spring to the protruded position and into the slot 128. The slot 128 has a certain length in the direction of the periphery of the part 114a within the clutch body 100 as shown in FIG. 3. The second engaging element 118 is then able to move in the rotating direction with respect to slot 128, whereat the part 114a within the clutch body 100 engages with the internal engaging surface 120 of the clutch body 100. The torque will then be directly transmitted from the driving shaft 111 to the driven shaft 112. When the driving shaft 111 is retarded, in other words when the driven shaft 112 becomes the driving shaft and the driving shaft 111 becomes the driven shaft, parts 114a and 114 within the clutch body 100 turn around to the driving direction of the vehicle, whereat the second engaging element 118 hits the edge of the slot 128 and prevents the parts 114 and 114a within the clutch body 100 from engaging with the internal engaging surface 120 of the clutch body 100. Now the apparatus is disengaged, and torque is not transmitted from the driving shaft 111 to the driven shaft 112 or vice versa. When the drive is reengaged to the driving shaft 111, torque will again be transmitted from the driving shaft 111 to the driven shaft 112.

For engine braking with an apparatus in accordance with FIG. 4 the procedure is as follows. At first the clutch 166 is disengaged so that the rotating speed of the driving shaft 111 grows higher than the rotating speed of the flywheel 162. The spindle 152 rotates at the same speed as the flywheel 162 so that there is a notable speed difference between the driving shaft 111 and the spindle 152. The screw pump shaped to the spindle 152 now creates a vacuum under the second engaging element 118, which vacuum pushes the second engaging element 118 to its inner position. The clutch body 100 is of course filled with oil in the same way as the clutch body 10 of FIG. 1. Therefore the screw pump 154 sucks oil from the end where the second engaging element 118 is and pushes it out of the boring 150 through the radial boring 160. When the second engaging element 118 has retracted into its inner position, the parts 114 and 114a within the clutch body 100 engage with the internal engaging surface of the clutch body 100. When the vehicle clutch 166 is now reengaged, the engine brakes the vehicle. The engine will brake until the rotating speed of the flywheel 162 is increased higher than the rotating speed of the driven shaft 112.

The invention has been described with reference to the figures of the accompanying drawing by way of examples only. The invention is by no means restricted to the embodiments illustrated in the figures; several other versions are possible within the framework of the inventional idea.

I claim:

1. Apparatus for transmitting torque from a drive shaft to a driven shaft, comprising
    an inner shaft coupled to one of said drive shaft and driven shaft,
    an outer clutch body coupled to the other of said drive shaft and driven shaft,
    at least one engaging portion situated within said clutch body and having an inner engaging surface having a center line deviating from a center line of said inner shaft, and an outer engaging surface having a center line substantially the same as the center line of said inner shaft,
    at least one engaging section positioned on said inner shaft to engage said inner surface of said engaging portion, and cause said outer surface of said engaging portion to engage an inner engaging surface of said clutch body when said engaging portion is in engaging position, and
    at least one engaging element positioned on said inner shaft to engage said engaging portion when said engaging portion is in disengaging position, and which is disengaged form said engaging portion when said engaging portion is in the engaging position,
    said engaging element being positioned on said inner shaft to engage said engaging portion at a certain or higher rotating speed of said drive shaft, and to be disengaged from said engaging portion at a lower rotating speed of said drive shaft.

2. The combination of claim1, wherein said clutch body is coupled to said driven shaft and said inner shaft is coupled to said drive shaft.

3. The combination of claim 1 additionally comprising
    a plurality of engaging portions each arranged between said clutch body and inner shaft.

4. The combination of claim 3, wherein said engaging portions are arranged, one after the other over an axial direction of said inner shaft, and
   said engaging element is positioned to engage or disengage from one of said two engaging portions.

5. The combination of claim 4, wherein said engaging portions additionally comprise mating surfaces which prevent the same from rotating with respect to one another, but permit radial movement with respect to one another.

6. The combination of claim 3, additionally comprising
   a plurality of engaging sections, each said engaging section being positioned on said inner shaft to engage a respective engaging portion, and
   each said engaging section having an external engaging surface with a center line thereof deviating from the inner shaft center line.

7. The combination of claim 6, wherein center lines of internal and external surfaces of respectively engaging portions and sections are substantially the same.

8. The combination of claim 7, wherein center lines of said inner surfaces of said two engaging portions are different from one another.

9. The combination of claim 6, additionally comprising
   a flange situated on said inner shaft between said two engaging sections and for separating said two engaging portions from one another.

10. The combination of claim 1 wherein said at least one engaging element is a pin movably mounted in a substantially radial bore in said inner shaft.

11. The combination of claim 10, additionally comprising a slot formed in said at least one engaging portion and into which said pin extends when in engaging position.

12. The combination of claim 10, wherein said pin is mounted to engage said at least one portion by centrifugal force, and additionally comprising
   a spring mounted in said bore and biasing said pin against the centrifugal force, for disengaging said pin from said at least one engaging portion.

13. The combination of claim 1, wherein said clutch body and said at least one engaging portion are positioned with respect to one another to form a clearance between said external surface of said at least one portion and said internal surface of said clutch body, which permits rotation of said at least one engaging portion with respect to said clutch body.

14. The combination of claim 1, wherein a center line of said at least one engaging section also deviates from the center line of said inner shaft.

15. The combination of claim 1, wherein a contact angle between said respective inner and outer surfaces of said clutch body and engaging portion, is greater than 180°.

16. The combination of claim 15, wherein said contact angle is as large as 360°.

* * * * *